US011809181B2

(12) United States Patent
Buttolo et al.

(10) Patent No.: US 11,809,181 B2
(45) Date of Patent: Nov. 7, 2023

(54) SYSTEMS AND METHODS FOR REMOTE CONTROL OF VEHICLES

(71) Applicant: Ford Global Technologies, LLC, Dearborn, MI (US)

(72) Inventors: Pietro Buttolo, Dearborn Heights, MI (US); John Randolf Vincent, Livonia, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 17/174,253

(22) Filed: Feb. 11, 2021

(65) Prior Publication Data
US 2022/0253055 A1    Aug. 11, 2022

(51) Int. Cl.
| G06F 3/03 | (2006.01) |
| G06F 3/0346 | (2013.01) |
| G06F 3/038 | (2013.01) |
| G05D 1/00 | (2006.01) |

(52) U.S. Cl.
CPC ......... G05D 1/0044 (2013.01); G05D 1/0038 (2013.01)

(58) Field of Classification Search
CPC .............. G05D 1/0044; G05D 1/0038; G05D 2201/0213; G05D 1/0027; G06F 3/03; G06F 3/0346; G06F 3/038; G05B 23/0213
USPC .......................................................... 701/2
See application file for complete search history.

(56) References Cited

U.S. PATENT DOCUMENTS

| 6,771,188 B2* | 8/2004 | Flick .................. B60R 25/33 340/988 |
| 6,812,888 B2* | 11/2004 | Drury ............. G08G 1/096872 342/357.31 |
| 7,312,696 B2* | 12/2007 | Flick .................. G08G 1/205 701/32.4 |
| 7,317,974 B2* | 1/2008 | Luskin ................ H04L 67/34 701/32.7 |
| 7,953,526 B2* | 5/2011 | Durkos ............... G05D 1/0278 701/25 |
| 9,002,554 B2* | 4/2015 | Chen ...................... G07C 5/008 340/901 |
| 9,669,783 B2* | 6/2017 | Kim .................... B60R 16/037 |
| RE47,354 E * | 4/2019 | Flick .................... B60R 25/102 |
| 10,688,915 B1* | 6/2020 | Rastoll .................. B60Q 1/50 |
| 10,775,782 B2* | 9/2020 | Yoon .................... B60W 30/06 |
| 2007/0072662 A1 | 3/2007 | Templeman |

(Continued)

OTHER PUBLICATIONS

"Explore the biggest model railway with the tiniest Street View—#MiniView on Google Maps" available at https://www.youtube.com/watch?v=G6G17uU3Y_8 last accessed Jul. 22, 2023 (Year: 2016).*

(Continued)

*Primary Examiner* — Hunter B Lonsberry
*Assistant Examiner* — Robert Louis Pinkerton
(74) *Attorney, Agent, or Firm* — Brandon Hicks; Eversheds Sutherland (US) LLP

(57) ABSTRACT

The disclosure describes systems and methods including for monitoring and remotely controlling a fleet of autonomous vehicles. The remote vehicle control system includes a horizontal display with vehicle graphics on a map and determines a control input to control a vehicle based on a device input from an input device.

14 Claims, 8 Drawing Sheets

(56) References Cited

U.S. PATENT DOCUMENTS

| | | | |
|---|---|---|---|
| 2015/0350413 A1* | 12/2015 | Ma | H04M 1/72454 |
| | | | 455/418 |
| 2016/0147233 A1* | 5/2016 | Whinnery | B60K 37/06 |
| | | | 701/2 |
| 2016/0378111 A1 | 12/2016 | Lenser et al. | |
| 2017/0055433 A1* | 3/2017 | Jamison | G05D 1/104 |
| 2017/0329325 A1* | 11/2017 | Hong | G05D 1/0044 |
| 2017/0371515 A1* | 12/2017 | Feit | G06F 3/0482 |
| 2019/0250603 A1* | 8/2019 | Tod | G05D 1/0033 |

OTHER PUBLICATIONS

K.S. Swanson et al. "Extending Driving Simulator Capabilities Toward Hardware-in-the-Loop Testbeds and Remote Vehicle Interfaces" (Jun. 2013) pp. 115-120.

* cited by examiner

10
SYSTEMS AND METHODS FOR REMOTE CONTROL OF VEHICLES

BACKGROUND

The number of vehicle miles traveled using ridesharing is rapidly increasing. Autonomous vehicles could further increase the share of vehicle miles traveled with ridesharing. Some autonomous vehicles are in use in geo-fenced areas with operators on board for data analysis, supervision, and to take over in case of emergency. Some autonomous vehicles have no backup driver on board.

To successfully deploy a fleet of autonomous vehicles, the vehicles may need to be monitored and controlled in case a vehicle needs assistance. Monitoring and controlling a large fleet of vehicles may be difficult for an operator. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to remotely control a vehicle. For example, the systems and methods may be used for monitoring and remotely controlling a fleet of autonomous vehicles. The remote vehicle control system includes a horizontal display with vehicle graphics on a map and determines a control input to control a vehicle based on a device input from an input device such as a vehicle bot.

The vehicle can be a physical and virtual vehicle. A physical vehicle can be a vehicle with a level of automation, such as L2/L3, that allows to be commanded and controlled remotely or a fully autonomous vehicle. A virtual vehicle can a vehicle that functions like a real one, driven or autonomous, in a computer simulation environment, including video gaming.

Figure 1:
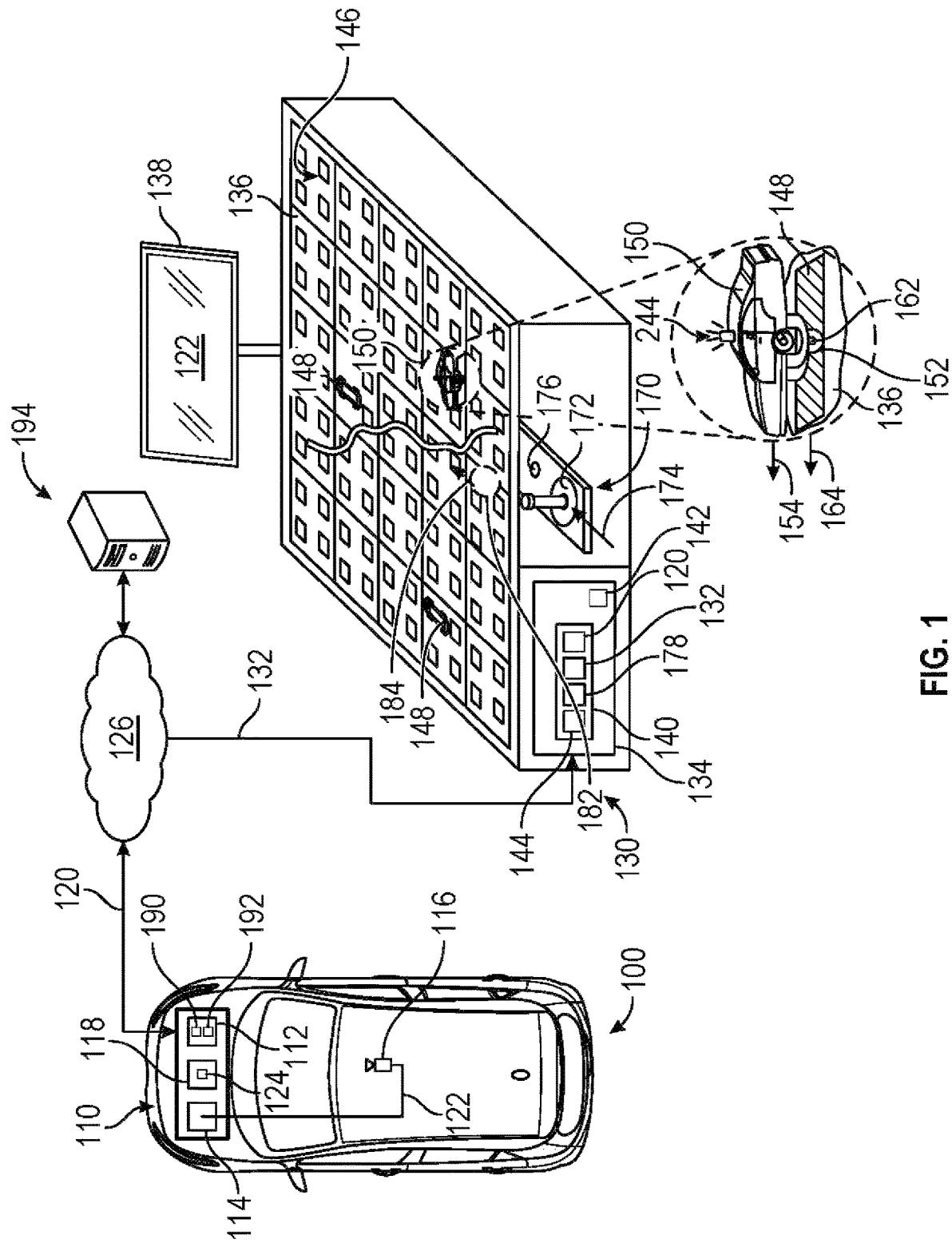
FIG. 1 depicts a vehicle and a remote vehicle control system in accordance with the present disclosure.

Referring to FIG. 1, a vehicle 100 includes a vehicle control system 110. The vehicle control system 110 includes a vehicle computer 112, a camera system 114 including a camera 116, and a navigation (NAV) system 118. The vehicle control system 110 is configured to provide vehicle data 120, including video data 122 from the camera 116 and vehicle location data 124 from the NAV system 118, to a remote vehicle control system 130 through a network 126.

The vehicle control system 110 is configured to control vehicle systems based on vehicle control inputs 132 received from the remote vehicle control system 130 through the network 126. The remote vehicle control system 130 allows an operator to monitor and control one or more vehicles 100 in an intuitive manner.

The remote vehicle control system 130 includes a remote computer 134, a horizontal display 136 (e.g., a tabletop display), and a vertical display 138. The remote computer 134 includes a memory 140 and a processor 142. The memory 140 includes geospatial data 144 and the processor 142 is configured to compile and format the geospatial data 144 to generate a digital image of a map 146 of a geographical area. The remote vehicle control system 130 displays the map 146 on the horizontal display 136.

The remote vehicle control system 130 further displays vehicle graphics 148 on the map 146. Each vehicle graphic 148 corresponds to a vehicle 100 in a fleet of vehicles 100. The remote vehicle control system 130 receives the vehicle location data 124 (e.g., location, direction, speed, etc.) from the NAV system 118 and displays the vehicle graphic 148 on the map 146 based on the vehicle location data 124.

The remote vehicle control system 130 includes vehicle bots 150 that are configured to move on a surface of the horizontal display 136. The vehicle bots 150 are configured to link to a vehicle 100, for example, when a vehicle 100 needs assistance or as a visual indicator of where a vehicle is located on the map and the movements of the vehicle.

When the vehicle bot 150 is linked to a vehicle 100, the vehicle bot 150 may follow or track a position 162 and a direction 164 of the associated vehicle graphic 148 as it moves on the horizontal display 136. Here, a position 152 and direction 154 of the vehicle bot 150 is or approximates the position 162 and direction 164 of the vehicle graphic 148. Using a vehicle bot 150, the location and movements of the vehicle 100 within the geographical area can be easily monitored such that a single operator at the remote vehicle control system 130 can monitor a fleet of vehicles.

The remote vehicle control system 130 includes an input device 170 that may include one or more input mechanisms. Exemplary input mechanisms include directional pads, buttons, analog sticks, joysticks, motion detection, touch screens, dials, pedals, paddles, trackballs, combinations thereof, and the like.

For example, the input device 170 includes a first input mechanism 172 (e.g., a joystick) that is configured to provide at least one of a directional input and a rotational input. The directional input may be based on or measured relative to a forward direction 174. The input device 170 also includes a second input mechanism 176 (e.g., a button) that is configured to provide a force input or a selection input. In some examples, an input mechanism such as a dial is configured to provide a rotational input.

The input device 170 is configured to control a vehicle 100. In particular, a device input from the input device 170 that matches a stored device input 178 is configured to generate a vehicle control input 132 to control the vehicle 100. For example, each stored device input 178 may include one or more inputs from one or more input mechanisms of the input device 170. Each stored device input 178 is associated with a vehicle control input 132.

To initiate control of a vehicle 100 with the input device 170, a vehicle bot 150 that is linked to a vehicle 100 may first be selected to select which of a fleet of vehicles is to be controlled. For example, the vehicle bot 150 may be tapped or depressed to select the vehicle bot 150. The selected vehicle bot 150 may provide a first visual indicator such as illuminating a light emitting diode (LED) 244 of the vehicle bot 150.

The input device 170 may then be used to select from a plurality of input devices (e.g., if there are more than one) and/or to confirm the selection of the vehicle 100 to be controlled and initiate a control mode. A control mode may be initiated if an input from the second input mechanism 176 is received within a time period that starts after the vehicle bot 150 is selected. If a control mode is initiated, the selected vehicle bot 150 may provide a second visual indicator such as illuminating the light emitting diode (LED) 244 of the vehicle bot 150.

In some examples, to select which of a fleet of vehicles is to be controlled, the horizontal display 136 may be a touchscreen and the vehicle graphic 148 may be selected by touching the touchscreen at the position 162 of the vehicle graphic 148. In other examples, the horizontal display 136 displays a cursor that is configured to be positioned (e.g., by the first input mechanism 172 of the input device 170) in the proximity of the vehicle graphic 148 and, along with a selection input from the second input mechanism 176, to select the vehicle graphic 148.

In some examples, the step of linking the vehicle bot 150 to a vehicle 100 may automatically activate a control mode using the input device 170 to control the vehicle 100.

In some examples, when the control mode is initiated, the vehicle bot 150 and the vehicle graphic 148 may be positioned with respect to a fixed position 182 and oriented with respect to a fixed direction 184, and the map 146 is generated around the fixed position 182 and oriented in the fixed direction 184 based on the vehicle location data 124. For example, the position 152 and direction 154 of the vehicle bot 150, and the position 162 and direction 164 of the vehicle graphic 148, are configured to be the same as the fixed position 182 and the fixed direction 184, respectively.

The direction 174 of the input device 170 is aligned with the direction 154 of the vehicle bot 150 and the direction 164 of the vehicle graphic 148. In examples where the vehicle bot 150 and the vehicle graphic 148 are positioned with respect to the fixed position 182 and oriented with respect to the fixed direction 184, the direction 174 of the input device 170 is aligned with the fixed direction 184.

The input device 170 may be located in a static location adjacent the horizontal display 136 that is convenient to an operator. The location of the input device 170 may be determined such that the direction 174 of the input device 170 is aligned with the fixed direction 184 and/or faces the vertical display 138. The input device 170 may also be wired to a static location or wirelessly connected to the remote computer 134.

In some examples, when the control mode is initiated, the video data 122 is displayed on the vertical display 138. In some examples, the video data 122 is displayed in a window on the horizontal display 136 (e.g., adjacent the fixed position 182). In some examples, the vehicle bot 150 includes a display or screen to present the video data 122 from the vehicle 100.

Once a control mode is initiated, the remote vehicle control system 130 is configured to perform a method including determining a device input from the input device 170 and comparing the determined device input to a set of stored device inputs 178. If the determined device input matches one of the set of stored device inputs 178, a vehicle control input 132 that is associated with the one of the set of stored device inputs 178 is selected as a vehicle control input 132 for the associated vehicle 100.

Various device inputs from the input device 170 include a directional input (e.g., of the first input mechanism 172), a rotational input (e.g., of the first input mechanism 172), a number of force inputs (e.g., of the second input mechanism 176), combinations thereof, and the like. An amount of an input be determined by an amount of time that an input mechanism is directed in a direction, a number of taps associated with the direction, and the like.

As the direction 174 of the input device 170 corresponds to the direction 154 of the vehicle bot 150 and the direction 164 of the vehicle graphic 148, directional inputs from input device 170 may be measured relative to the direction 174. For example, an angle or directional input with the first input mechanism 172 can be measured relative to the direction 174 to define at least part of a device input 178.

The stored device inputs 178 are associated with vehicle control inputs 132 to the vehicle 100. Vehicle control inputs 132 may include direct control inputs (e.g., related to steering, accelerating, braking) such changing lane, turning left or right, accelerating or decelerating, and the like. Vehicle control inputs 132 may also include broader command inputs from which the remote computer 134 or the vehicle computer 112 determines steps to achieve a desired result. Broad command inputs may include a request to pull over, stop at a refueling station, wait for a tow truck, reroute on a different path, change destination, combinations thereof, and the like.

These and other advantages of the present disclosure are provided in greater detail herein.

Illustrative Embodiments

The disclosure will be described more fully hereinafter with reference to the accompanying drawings, in which embodiments of the disclosure are shown, and not intended to be limiting.

Referring to FIG. 1, the vehicle 100 may take the form of a passenger or commercial automobile such as, for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, and the like.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level 5 autonomy) or in one or more partial autonomy modes. Examples of partial autonomy modes are widely understood in the art as autonomy Levels 1 through 5.

Referring to FIG. 1, the vehicle 100 includes the vehicle control system 110. The vehicle control system 110 includes the vehicle computer 112, the camera system 114 including the camera 116, and the navigation (NAV) system 118 (GPS). The vehicle control system 110 is configured to provide vehicle data 120, including video data 122 from the camera 116 and vehicle location data 124 from the NAV system 118, to the remote vehicle control system 130 through the network 126.

The vehicle computer 112 may be or include an electronic vehicle controller. The vehicle computer 112 may be installed in an engine compartment of the vehicle 100 as schematically illustrated or elsewhere in the vehicle 100. The vehicle computer 112 includes a computer-readable memory 190 and one or more processor(s) 192.

The one or more processor(s) 192 may be disposed in communication with one or more memory devices disposed in communication with the respective computing systems (e.g., the memory 190 and/or one or more external databases 194). The processor(s) 192 may utilize the memory 190 to store programs in code and/or to store data for performing aspects of methods of the vehicle control system 110 in accordance with the disclosure.

The memory 190 may be a non-transitory computer-readable memory storing program code. The memory 190 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

As described in further detail below, the vehicle computer 112 may, in some example embodiments, be disposed in communication with one or more server(s) 194.

The vehicle control system 110 is configured to control vehicle systems (e.g., described in further detail below with respect to FIG. 12) based on vehicle control inputs 132 received from the remote vehicle control system 130 through the network 126. The remote vehicle control system 130 is configured to allow an operator to monitor and control one or more vehicles 100 in an intuitive manner.

The remote vehicle control system 130 includes the remote computer 134. The remote computer 134 includes a memory 140 and a processor 142. The description of the memory 190 and the processor 192 is generally applicable to the memory 140 and the processor 142, respectively.

The memory 140 includes geospatial data 144, vehicle location data 124, the set of device inputs 178, and the vehicle control inputs 132.

The processor 142 is configured to compile and format the geospatial data 144 to generate a digital image of the map 146 of a geographical area. The geospatial data 144 may include various layers including roadways and other points of interest such as buildings and other landmarks that may be geocoded for placement on a map.

In compiling and formatting the geospatial data 144, a geographic coordinate system (e.g., latitude and longitude) of the geospatial data 144 may be converted to a projected coordinate system. The projected coordinate system is aligned with a screen coordinate system (e.g., the pixels of a screen of the horizontal display 136). For example, a selected geographic coordinate (e.g., a city center) is aligned with a center of the screen of the horizontal display 136 and additional geographic coordinates are aligned with the screen coordinate system based on a selected scale of the map 146. As another example, a selected geographic coordinate (e.g., the vehicle location data 124) is aligned with the fixed position 182 on the screen of the horizontal display 136 and the digital image of the map 146 is updated based on the position and orientation (e.g., the vehicle location data 124) of the vehicle 100.

The screen coordinate system is also a coordinate system for physical positions or locations on the surface of the horizontal display 136. Accordingly, the geospatial data 144 are associated with physical locations on the surface of the horizontal display 136.

The remote vehicle control system 130 displays the vehicle graphics 148 on the map 146. Each vehicle graphic 148 corresponds to a vehicle 100 in a fleet of vehicles. The remote vehicle control system 130 receives the vehicle location data 124 (e.g., location, direction, speed) from the NAV system 118 and displays the vehicle graphic 148 on the map 146 based on the vehicle location data 124.

Figure 2:
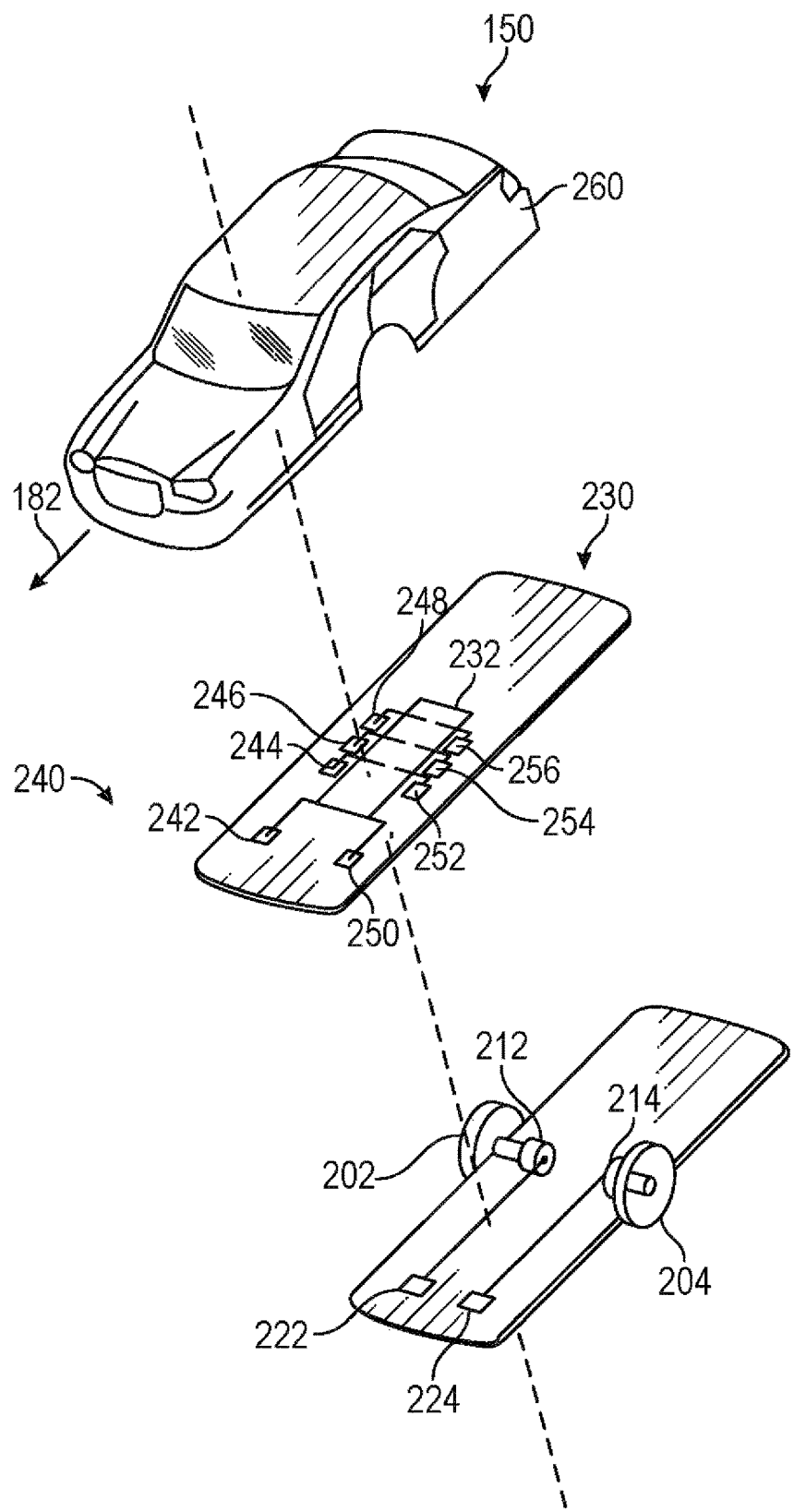
FIG. 2 depicts a vehicle bot of the remote vehicle control system of FIG. 1 in accordance with the present disclosure.

The remote vehicle control system 130 includes vehicle bots 150 that are configured to move on the horizontal display 136. Referring to FIG. 2, an example vehicle bot 150 includes two parallel wheels 202, 204. The parallel wheels 202, 204 are independently driven by motors 212, 214. The motors 212, 214 are connected to encoders 222, 224 that measure the rotation of the wheels 202, 204.

The vehicle bots 150 may have other drive trains including a four-wheel drive, a six-wheel drive, an H-drive that uses four omni-directional wheels and a fifth omni-directional wheel set perpendicular between the other wheels of the drivetrain, and the like.

The vehicle bot 150 includes a circuit board 230 with a microcontroller 232 may include a memory, a processor, and programmable input/output peripherals 240 or connections thereto. The microcontroller 232 is configured to control and manage the peripherals 240 including the motors 212, 214, the encoders 222, 224, and other sensors and devices. For example, the peripherals 240 may include sensors and other devices such as wireless communication devices 242 (e.g., Bluetooth or Radio Frequency), light emitting diodes 244, optical sensors or cameras 246, color sensors 248 for detecting lines and colors, a compass 250, proximity sensors 252, an accelerometer 254 (or other vibration or force sensors), a gyroscope 256, and the like.

The vehicle bot 150 may include a vehicle-shaped housing 260. For example, the vehicle-shaped housing 260 may be 3D printed. The housing 260 may be shaped to provide directional information to the operator.

The position of the vehicle bot 150 on the horizontal display 136 may be determined based on the odometry (e.g., with the encoders 222, 224) and the distance each wheel 202, 204 travels. The vehicle bot 150 and/or the remote vehicle control system 130 may additionally or alternatively determine the position of the vehicle bot 150 on the horizontal display 136, for example, using other peripherals 240 including inertial navigation systems (e.g., with the accelerometer 254 and the gyroscope 256), with beacons (e.g., using triangulation or trilateration), with a magnetic compass 250, cameras 246 or color sensors 248 (e.g., matching a local map to global map), combinations thereof, and the like.

The vehicle bot 150 is configured to communicate with the remote computer 134 via a peripheral 240 such as the wireless communication device. For example, the vehicle bat 150 is configured to receive the position 162 and direction 164 of the vehicle graphic 148 and the position 152 and direction 154 of the vehicle bot 150. The vehicle bot 150 is configured to navigate the surface of the horizontal display 136 based on positional information from the remote computer 134 and/or based on measurements from peripherals 240 such as the optical sensors or cameras 246, color sensors 248, compass 250, and proximity sensor 252.

The vehicle bot 150 is configured to measure selection of the vehicle bot 150 based on measurements from peripherals 240 including the accelerometer 254 and the like.

Figure 3:
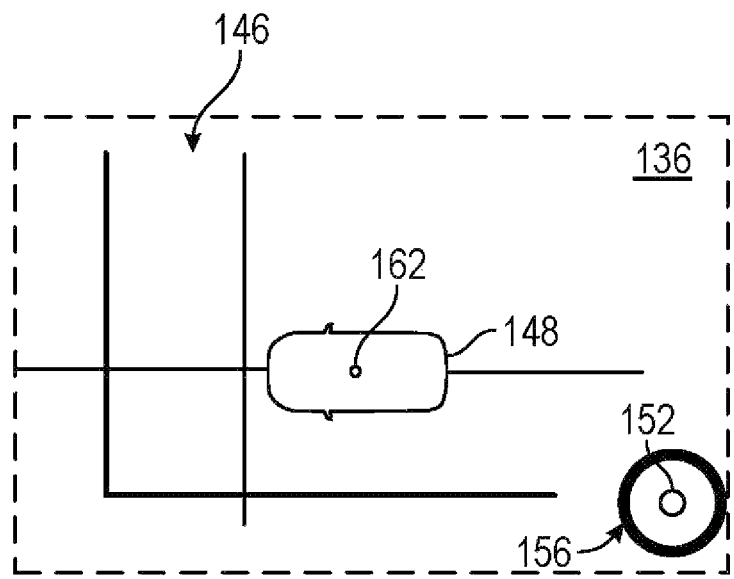
FIGS. 3 and 4 depict a method of linking a vehicle and a vehicle bot including moving the vehicle bot to a vehicle graphic associated with the vehicle in accordance with the present disclosure.
Figure 4:
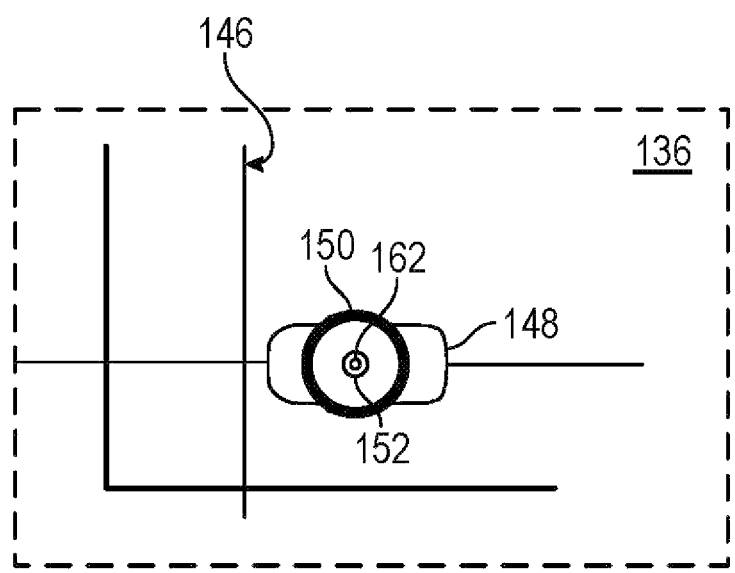

Referring to FIGS. 3 and 4, the vehicle bots 150 (represented in FIGS. 3-5 and FIG. 11 as a circle) are configured to link to a vehicle 100. For example, a vehicle bot 150 may be linked to a vehicle 100 when the position 152 of the vehicle bot 150 matches the position 162 of the vehicle graphic 148 of the associated vehicle 100 for a threshold amount of time. In FIG. 3, the position 152 of the vehicle bot 150 is spaced apart from the position 162 of the vehicle graphic 148. In FIG. 4, the position 152 of the vehicle bot 150 matches the position 162 of the vehicle graphic 148 to link the vehicle bot 150 to the vehicle 100.

Alternatively or additionally, to link a vehicle bot 150 to a vehicle 100, the vehicle bot 150 may read a visual code that is part of the vehicle graphic 148 with a color sensor 248, or an optical sensor or camera 246.

When the vehicle bot 150 is linked to a vehicle 100, the vehicle bot 150 may track or follow the associated vehicle graphic 148 as the vehicle graphic 148 moves on the horizontal display 136 based on the vehicle location data 124. For example, the remote vehicle control system 130 or the vehicle bot 150 may determine the distance and direction between the position 152 of the vehicle bot 150 and the position 162 of the vehicle graphic 148, and use a proportional-integral-derivative (PID) controller to determine the corresponding controls for the motors 212, 214 to move the vehicle bot 150 in the direction of the vehicle graphic 148, at a speed determined by the PID controller, until a distance between the vehicle bot 150 and the vehicle graphic 148 is zero.

By linking the vehicle bot 150 to a vehicle 100, the location and movements of the vehicle 100 can be easily monitored by monitoring the vehicle bot 150 on the map 146. A single operator using the remote vehicle control system 130 can monitor a fleet of vehicles.

When the vehicle bot 150 is linked to a vehicle 100, the input device 170 is configured to be used to control the vehicle 100. To initiate control of a vehicle 100, a vehicle bot 150 that is linked to the vehicle 100 may first be selected to select the vehicle 100 to be controlled with the input device 170. On/off selection of vehicle bots 150 may be used so that only those vehicles 100 that require assistance are actively controlled by the input device 170. In some examples, selective linking of vehicle bots 150 is used so that only those vehicles 100 that require assistance are actively controlled.

The vehicle bot 150 may be tapped or depressed to select the vehicle bot 150. The vehicle bot 150 may measure the tapping or pressing of the vehicle bot 150 with the accelerometer 254. Registering the measurement may activate a control mode to control the vehicle 100 with the input device 170. Alternatively, linking the vehicle bot 150 to the vehicle 100 may automatically activate a control mode.

The input device 170 may then be used to select from a plurality of input devices (e.g., if there are more than one) and/or to confirm the selection of the vehicle 100 to be controlled and initiate a control mode. A control mode may be initiated if an input from the second input mechanism 176 is received within a time period that starts after the vehicle bot 150 is selected. If a control mode is initiated, the selected vehicle bot 150 may provide a second visual indicator such as illuminating the light emitting diode (LED) 244 of the vehicle bot 150.

In some examples, to select which of a fleet of vehicles is to be controlled, the horizontal display 136 may be a touchscreen and the vehicle graphic 148 may be selected by touching the touchscreen at the position 162 of the vehicle graphic 148. In other examples, the horizontal display 136 displays a cursor that is configured to be positioned (e.g., by the first input mechanism 172 of the input device 170) in the proximity of the vehicle graphic 148 and, along with a selection input from the second input mechanism 176, to select the vehicle graphic 148.

In some examples, the step of linking the vehicle bot 150 to a vehicle 100 may automatically activate a control mode using the input device 170 to control the vehicle 100.

Figure 5:
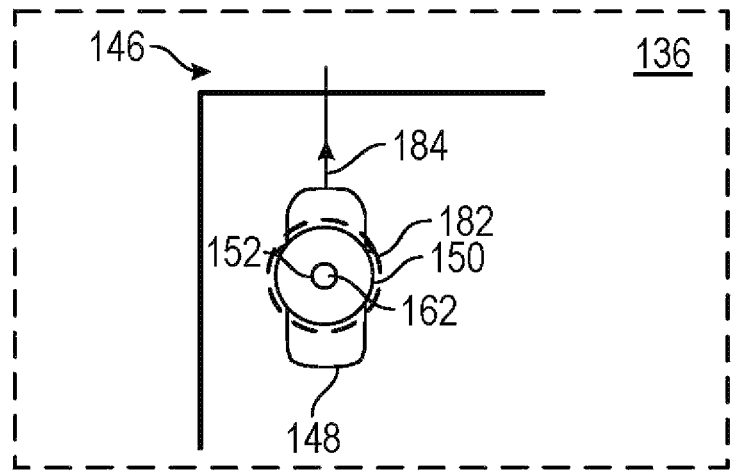
FIG. 5 depicts the vehicle bot and the vehicle graphic of FIGS. 3-4 in a fixed location and a fixed direction in accordance with the present disclosure.

Referring to FIG. 5, in some examples where the vehicle bot 150 is linked or selected, the vehicle bot 150 and the vehicle graphic 148 are positioned in the fixed position 182 (e.g., where the selection occurs or at a pre-designated position such as the center or edge of the horizontal display 136) and oriented in a fixed direction 184. Here, the map 146 is generated around the fixed position 182 and in the fixed direction 184 based on the vehicle location data 124. For example, geographic coordinates are aligned with the screen coordinate system based on the fixed position 182, the fixed direction 184, and a selected scale of the map 146.

Figure 6:
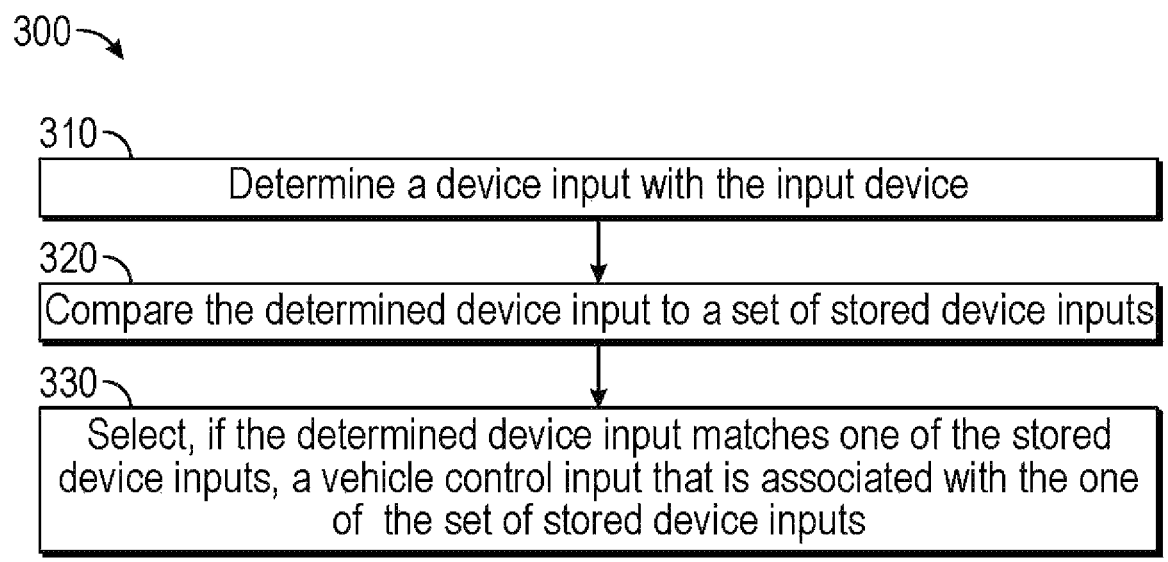
FIG. 6 depicts a method of controlling a vehicle with a remote vehicle control system in accordance with the present disclosure.

Once a control mode is activated, the remote vehicle control system 130 is configured to perform a method 300. Referring to FIG. 6 and according to a first step 310, the remote vehicle control system 130 determines a device input from the input device 170. According to a second step 320, the remote vehicle control system 130 compares the determined device input to a set of stored device inputs 178. According to a third step 330, if the determined device input matches one of the stored device inputs 178, a vehicle control input 132 that is associated with the one of the set of stored device inputs 178 is selected as a vehicle control input 132 for the associated vehicle 100.

The input device 170 may measure various inputs to the input mechanisms of the input device 170 including a directional input, a rotational input, a number of force inputs and/or taps, combinations thereof, and the like.

Directional inputs may be measured relative to the direction 174, which corresponds to the forward direction 164 of the vehicle graphic 148, the forward direction of the vehicle bot 150, and in some cases the fixed direction 184.

The stored device inputs 178 are associated with vehicle control inputs 132. Referring to FIGS. 7-10, stored device inputs 178 are associated with vehicle control inputs 132 that directly control the actions of the vehicle 100. Vehicle control inputs 132 that directly control the actions of the vehicle 100 may be related to steering, accelerating, and braking. For example, the vehicle control inputs 132 may include changing lane, turning left or right, accelerating or decelerating, and the like.

Figure 7:
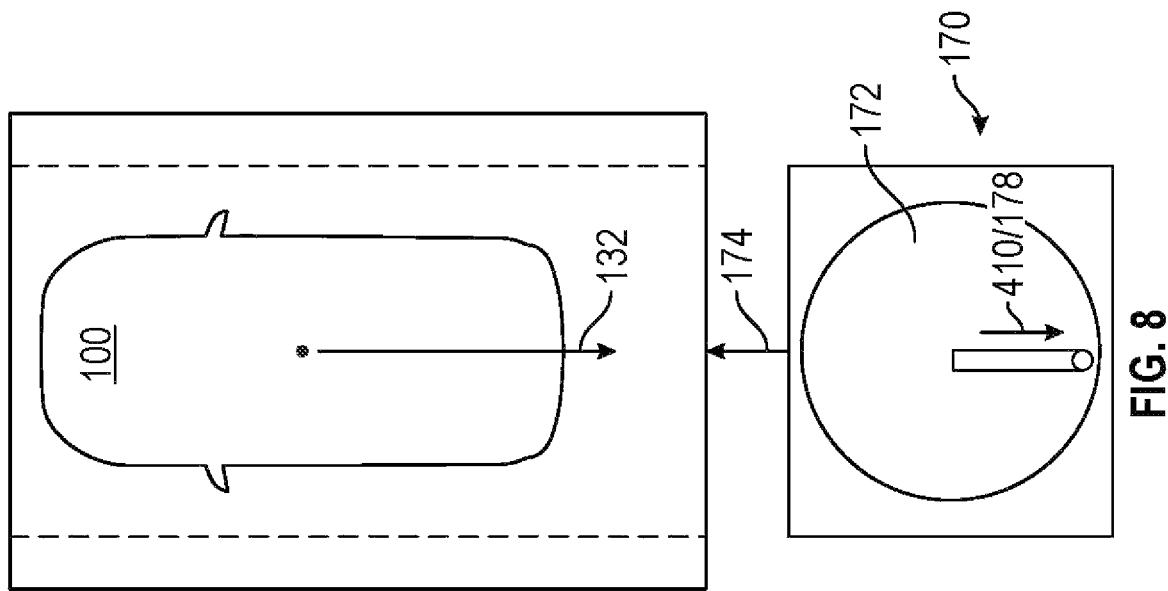
FIGS. 7-10 depict device inputs with the input device in accordance with the present disclosure.
Figure 8:
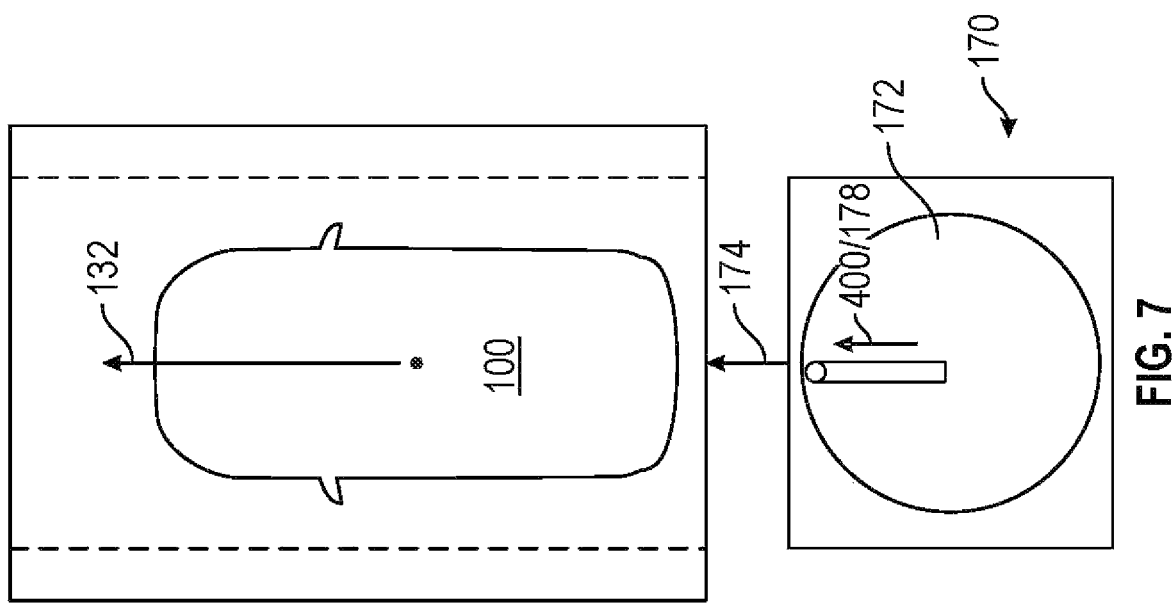

Referring to FIG. 7, a first stored device input 178 may be a directional input in the forward direction 400 (e.g., the direction 174) that corresponds to an acceleration vehicle control input 132. Referring to FIG. 8, a second stored device input 178 may be a directional input in the reverse direction 410 (e.g., opposite the direction 174) that corresponds to a deceleration control input 132.

Figure 9:
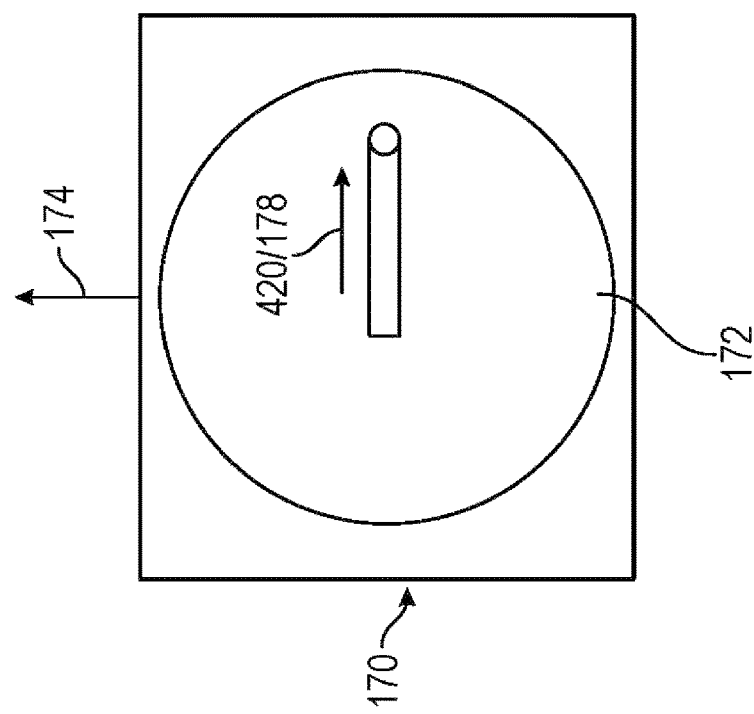
Figure 9:
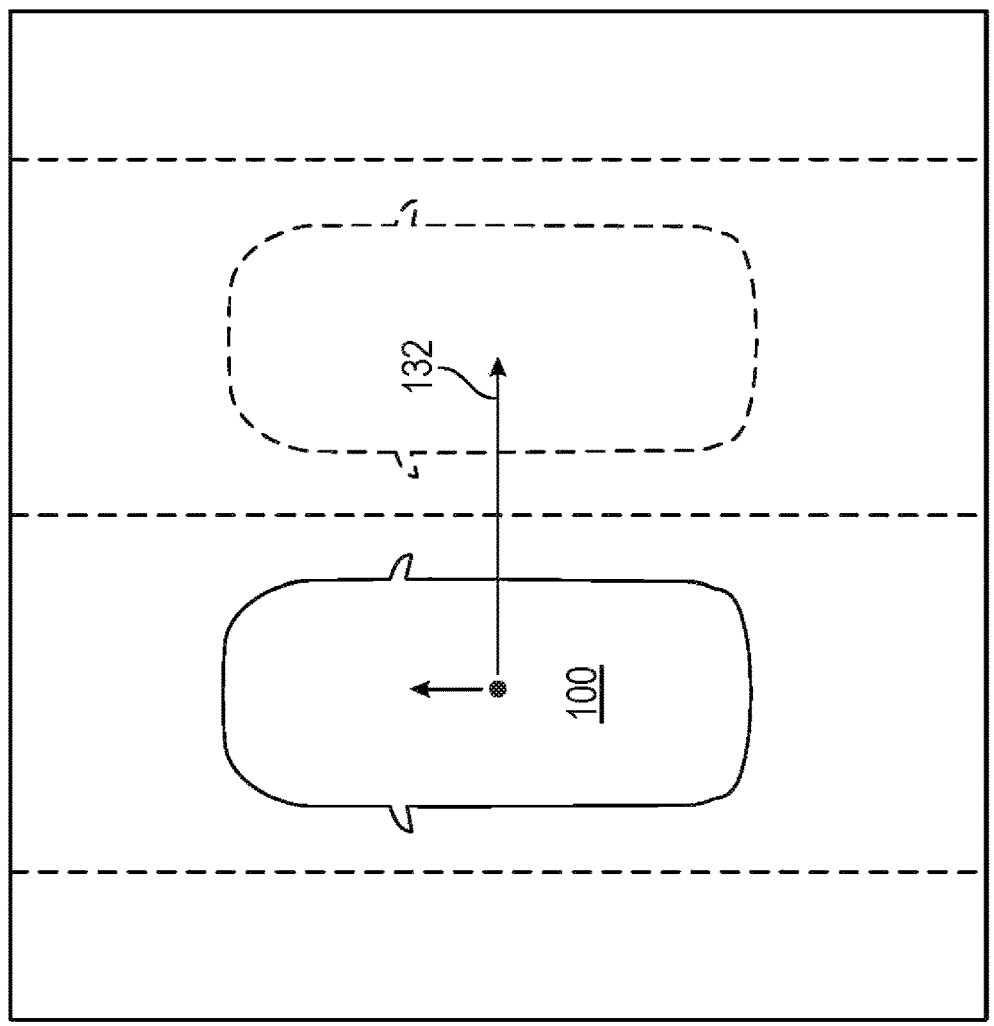

Referring to FIG. 9, a third stored device input 178 may be a directional input in the right direction 420 that corresponds to a lane change vehicle control input 132.

Figure 10:
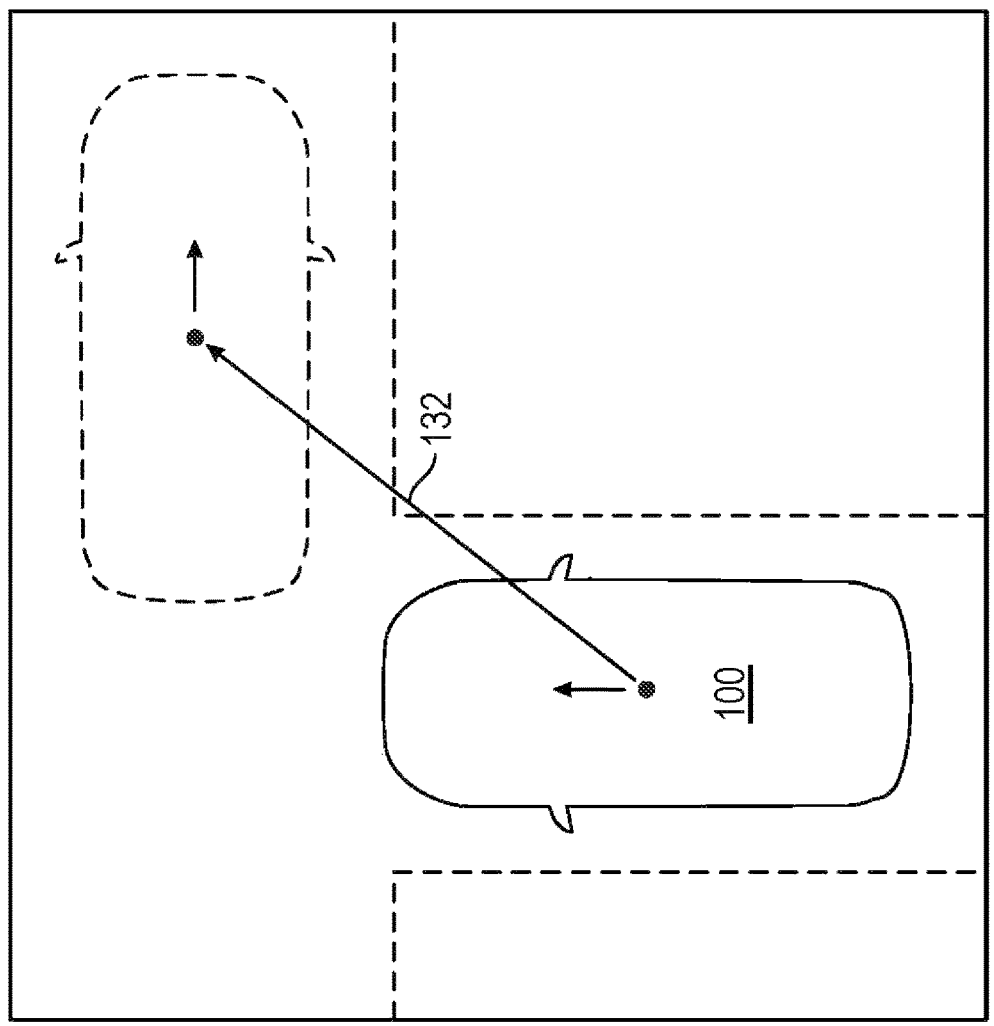
Figure 10:
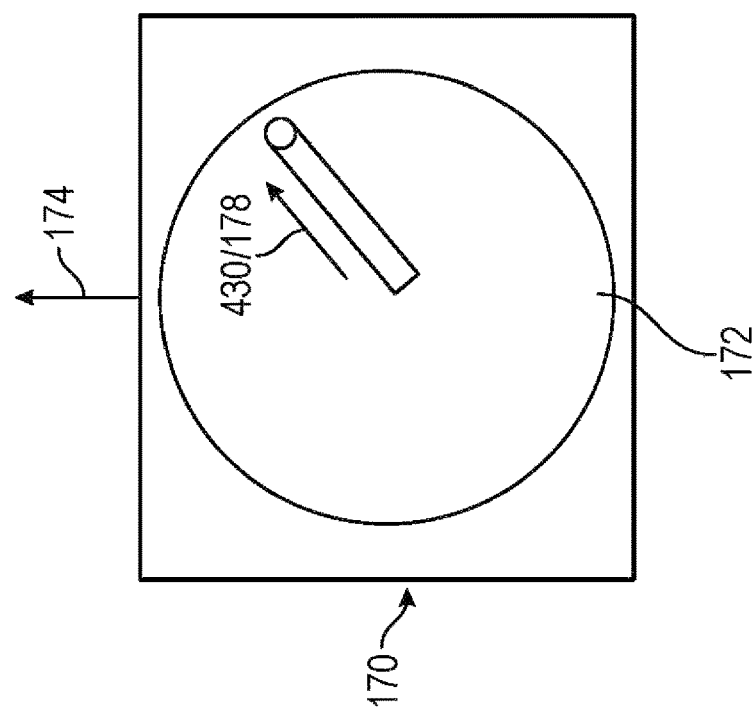

Referring to FIG. 10, a fourth stored device input 178 may be a directional input in a diagonal forward direction 430. The fourth stored device input 178 corresponds to a right turn vehicle control input 132.

Vehicle control inputs 132 may also include broader control inputs from which the remote computer 134 or the vehicle computer 112 determines steps to achieve a desired result. For example, broader vehicle control inputs 132 may include a request to pull over, stop at a refueling station, wait for a tow truck, reroute on a different path, change destination, combinations thereof, and the like.

Broad vehicle control inputs 132 may be associated with a stored device input 178 that indicates an angle. Here, the directional inputs at different angles (e.g., as described above with respect to FIGS. 7-10) may be associated with a desired result. Alternatively, the input device 170 may include a dial that can be rotated to scroll through different vehicle control inputs 132.

The input device 170 and/or the vehicle bot 150 may provide tactile detents or other feedback (e.g., a haptic signal such as vibration or a light signal) when an input with the input device 170 matches a stored device input 178. For example, the vehicle bot 150 may vibrate when a directional input is associated with a stored device input 178. The operator may confirm selection of the matched device input 178 (e.g., by maintaining the device input for a period of time or by a second device input) before the associated vehicle control input 132 is selected to control the vehicle 100.

Figure 11:
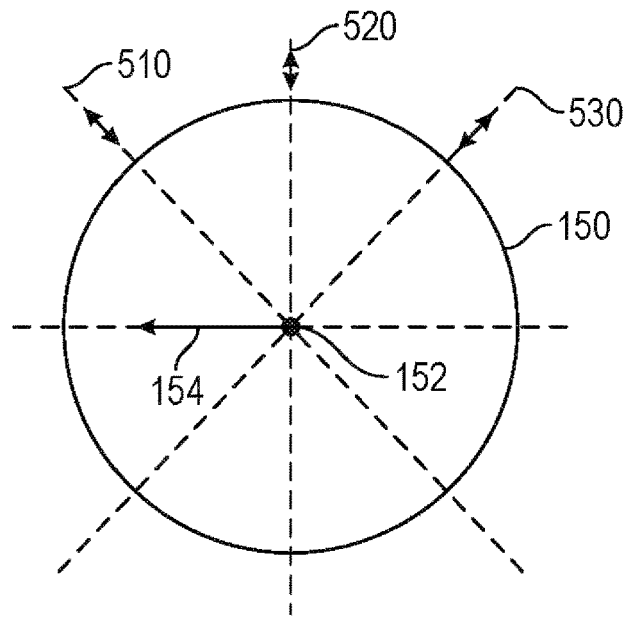
FIG. 11 depicts alerts generated by the control device in accordance with the present disclosure.

Additionally, the vehicle bot 150 may provide alerts or information while following the vehicle graphic 148, for example, to alert an operator that assistance is needed. The vehicle bot 150 may indicate an alert or information through movement or vibration at a certain angle. Referring to FIG. 11, a first alert is indicated by movement of the vehicle bot 150 at a first angle 510, a second alert is indicated by movement of the vehicle bot 150 at a second angle 520, and a third alert is indicated by movement of the vehicle bot 150 at a third angle 530.

Figure 12:
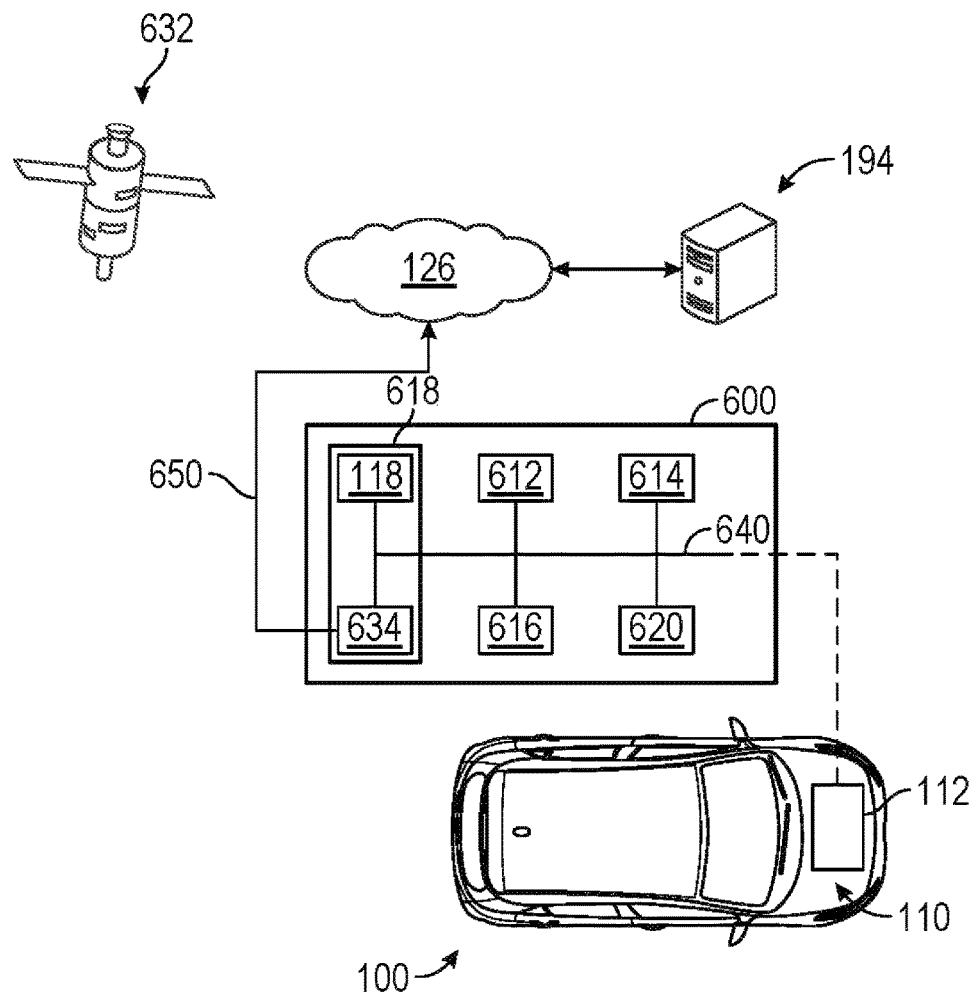
FIG. 12 depicts the vehicle of FIG. 1 with vehicle systems in accordance with the present disclosure.

Referring to FIG. 12, vehicle systems are described in greater detail. The vehicle 100 includes a Vehicle Controls Unit (VCU) 600. The VCU 600 includes a plurality of electronic control units (ECUs) 610 disposed in communication with the vehicle computer 112.

The VCU 600 may coordinate the data between vehicle systems, connected servers (e.g., the server(s) 194), and other vehicles operating as part of a vehicle fleet. The VCU 600 can include or communicate with any combination of the ECUs 610, such as, for example, a Body Control Module (BCM) 612, an Engine Control Module (ECM) 614, a Transmission Control Module (TCM) 616, a Telematics Control Unit (TCU) 618, a Restraint Control Module (RCM) 620, and the like.

The VCU 600 may control aspects of the vehicle 100, and implement one or more instruction sets (e.g., a vehicle control input 132) received from the remote vehicle control system 130 and/or from instructions received from a vehicle system controller (such as vehicle computer 112 described above).

The TCU 618 can be configured to provide vehicle connectivity to wireless computing systems onboard and offboard the vehicle 100 and is configurable for wireless communication between the vehicle 100 and other systems, computers, and modules. For example, the TCU 618 includes the Navigation (NAV) system 118 for receiving and processing a GPS signal from a GPS 632, a Bluetooth® Low-Energy Module (BLEM) 634, a Wi-Fi transceiver, an Ultra-Wide Band (UWB) transceiver, and/or other wireless transceivers.

The NAV system 118 may be configured and/or programmed to determine a position of the vehicle 100. The NAV system 118 may include a Global Positioning System (GPS) receiver configured or programmed to triangulate the position of the vehicle 100 relative to satellites or terrestrial based transmitter towers associated with the GPS 632. The NAV system 118, therefore, may be configured or programmed for wireless communication.

The NAV system 118 may be further configured or programmed to develop routes from a current location to a selected destination, as well as display a map and present driving directions to the selected destination via, e.g., a user interface. In some instances, the NAV system 118 may develop the route according to a user preference. Examples of user preferences may include maximizing fuel efficiency, reducing travel time, travelling the shortest distance, or the like.

The TCU 618 generally includes wireless transmission and communication hardware that may be disposed in communication with one or more transceivers associated with telecommunications towers and other wireless telecommunications infrastructure. For example, the BLEM 634 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The TCU 618 may be disposed in communication with the ECUs 610 by way of a Controller Area Network (CAN) bus 640. In some aspects, the TCU 618 may retrieve data and send data as a CAN bus 640 node.

The BLEM 634 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 634 may include Generic Attribute Profile (GATT) device connectivity for client devices that respond to or initiate GATT commands and requests, and connect directly with a mobile device.

The CAN bus 640 may be configured as a multi-master serial bus standard for connecting two or more of the ECUs 610 as nodes using a message-based protocol that can be configured and/or programmed to allow the ECUs 610 to communicate with each other. The CAN bus 640 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 610 may communicate with a host computer (e.g., the vehicle computer 112, the remote computer 134, and/or the server(s) 194, etc.), and may also communicate with one another without the necessity of a host computer.

The server(s) 194 may be part of a cloud-based computing infrastructure, and may be associated with and/or include a Telematics Service Delivery Network (SDN) that provides digital data services to the vehicle 100 and other vehicles that may be part of a vehicle fleet.

The CAN bus 640 may connect the ECUs 610 with the vehicle computer 112 such that the vehicle computer 112 may retrieve information from, send information to, and otherwise interact with the ECUs 610 to perform steps described according to embodiments of the present disclosure. The CAN bus 640 may connect CAN bus nodes (e.g., the ECUs 610) to each other through a two-wire bus, which may be a twisted pair having a nominal characteristic impedance. The CAN bus 640 may also be accomplished using other communication protocol solutions, such as Media Oriented Systems Transport (MOST) or Ethernet. In other aspects, the CAN bus 640 may be a wireless intra-vehicle CAN bus.

The VCU 600 may control various loads directly via the CAN bus 640 communication or implement such control in conjunction with the BCM 612. The ECUs 610 described with respect to the VCU 600 are provided for exemplary purposes only, and are not intended to be limiting or exclusive. Control and/or communication with other control modules is possible, and such control is contemplated.

The ECUs 610 may control aspects of vehicle operation and communication using inputs from human drivers, inputs from the vehicle control system 110, and/or via wireless signal inputs received via wireless channel(s) 650 from other connected devices such as a mobile device, among others. The ECUs 610, when configured as nodes in the CAN bus 640, may each include a central processing unit (CPU), a CAN controller, and/or a transceiver.

The BCM 612 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 612 may also operate as a gateway for bus and network interfaces to interact with remote ECUs.

The BCM 612 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 612 may be configured for vehicle energy management, exterior lighting control, wiper functionality, power window and door functionality, heating ventilation and air conditioning systems, and driver integration systems. In other aspects, the BCM 612 may control auxiliary equipment functionality, and/or is responsible for integration of such functionality. In one aspect, a vehicle having a vehicle control system 110 may integrate the system using, at least in part, the BCM 612.

The network(s) 126 illustrate an example of an example communication infrastructure in which the connected devices discussed in various embodiments of this disclosure may communicate. The network(s) 126 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A remote vehicle control system, comprising:
    a horizontal display;
    a vehicle bot configured to move on the horizontal display, to be selected to activate a control mode, and to provide a visual indicator when selected, wherein the vehicle bot is a physical vehicle bot configured to physically move on the horizontal display, and wherein the visual indicator is located on the vehicle bot;
    an input device comprising at least one input mechanism; and
    a remote computer, comprising:
        a processor; and
        a memory, comprising computer executable instructions that, when executed by the processor, cause the processor to:
            display, using the horizontal display:
                a digital image of a map of a geographical area; and
                a vehicle graphic at a location on the map, wherein the location of the vehicle graphic on the map is based on vehicle location data of a vehicle, wherein the vehicle bot is configured to link to the vehicle and, when linked, a first position and first direction of the vehicle bot is configured to correspond with a second position and second direction of the vehicle graphic;
            determine a first device input from the at least one input mechanism of the input device;
            determine the first device input matches one of a set of stored device inputs; and
            determine a vehicle control input that is associated with the one of the set of stored device inputs.

2. The remote vehicle control system of claim 1, wherein the vehicle bot is configured to move on the horizontal display in coordination with movement of the vehicle graphic.

3. The remote vehicle control system of claim 1, wherein the input device is configured to confirm a selection of the vehicle bot.

4. The remote vehicle control system of claim 1, wherein the second position and second direction of the vehicle graphic are a fixed position and a fixed direction.

5. The remote vehicle control system of claim 1, wherein the remote computer is configured to display video data from a camera associated with the vehicle on at least one of the horizontal display and a vertical display.

6. The remote vehicle control system of claim 1, wherein the at least one input mechanism is configured to provide at least one of a directional input, a rotational input, or a force input.

7. The remote vehicle control system of claim 6, wherein a directional input is measured with respect to a forward direction of the input device.

8. The remote vehicle control system of claim 7, wherein the forward direction of the input device corresponds to a forward direction of the vehicle graphic.

9. The remote vehicle control system of claim 1, wherein the vehicle control input is configured to cause the vehicle to perform at least one of change lane, turn left, turn right, accelerate, or decelerate.

10. The remote vehicle control system of claim 1, wherein the memory comprises computer executable instructions that, when executed by the processor, cause the processor to receive the vehicle location data from a navigation system of the vehicle.

11. The remote vehicle control system of claim 1, wherein the memory comprises computer executable instructions that, when executed by the processor, cause the processor to display a second vehicle graphic at a second location on the map, wherein the second location of the second vehicle graphic is based on vehicle location data received from a second vehicle.

12. The remote vehicle control system of claim 1, wherein the vehicle bot is configured to provide a feedback indicator when a device input from the input device matches a stored device input.

13. The remote vehicle control system of claim 1, wherein the vehicle bot is configured to provide an alert.

14. The remote vehicle control system of claim 13, wherein the alert is a vibration at an angle that is measured relative to a forward direction of the vehicle bot.

* * * * *